Aug. 7, 1956      B. C. DOUGLAS      2,757,871
INDICATOR SYSTEM FOR GAS-HEATED OVENS OR THE LIKE
Filed Sept. 28, 1953
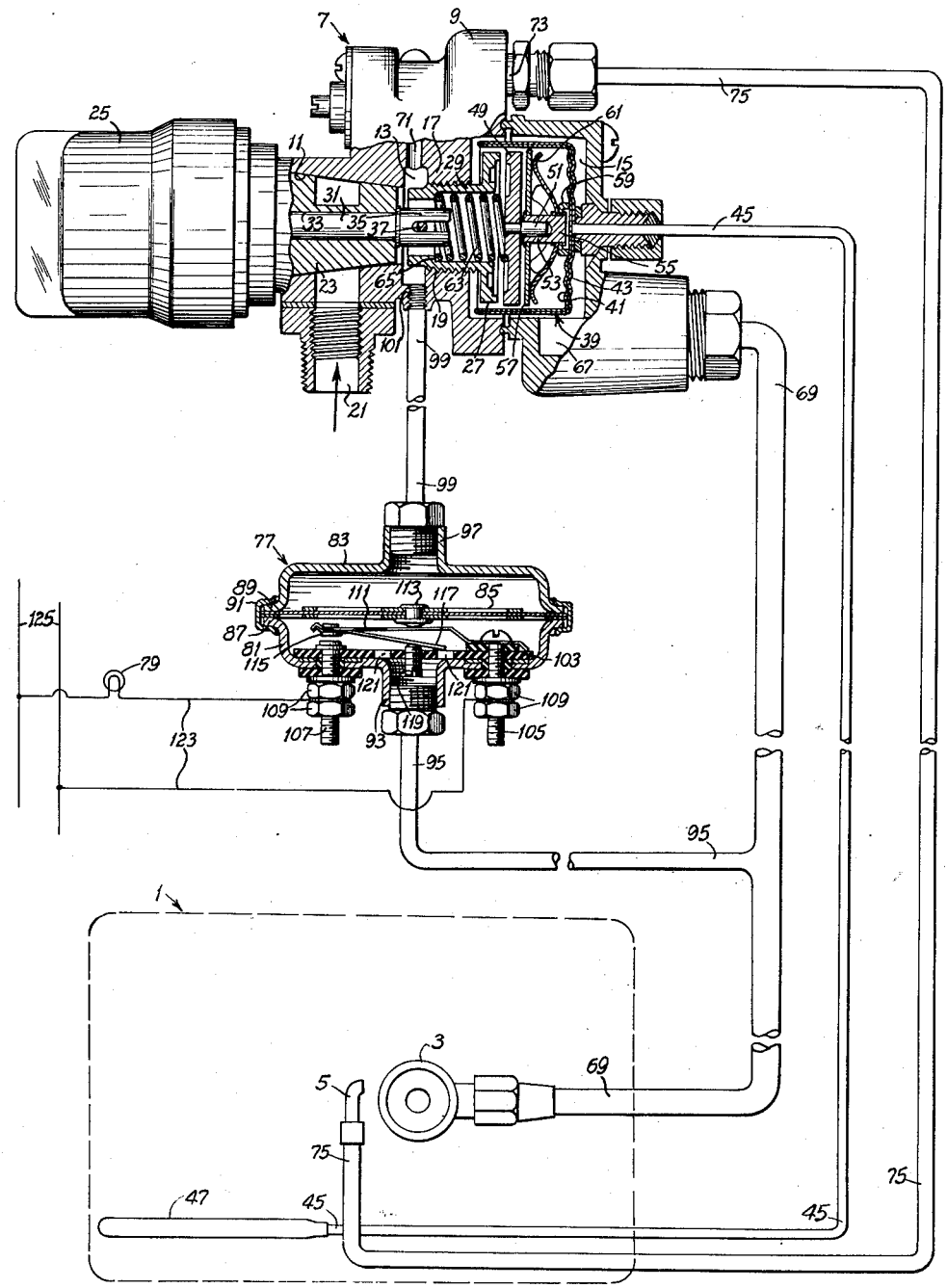
Bradley C. Douglas,
Inventor.
Koenig and Pope,
Attorneys.

United States Patent Office

2,757,871
Patented Aug. 7, 1956

2,757,871

INDICATOR SYSTEM FOR GAS-HEATED OVENS OR THE LIKE

Bradley C. Douglas, Kirkwood, Mo., assignor to Magic Chef, Inc., St. Louis, Mo., a corporation of New Jersey Application September 28, 1953, Serial No. 382,772

4 Claims. (Cl. 236—94)

This invention relates to indicator systems for gas-heated ovens or the like, and more particularly to a system for indicating when the temperature of a gas-heated range oven has been increased to a desired substantially steady value.

Among the several objects of the invention may be noted the provision of a simplified system for indicating when a gas-heated oven or the like has been heated to a desired substantially steady temperature; the provision of a system of this class particularly for use in conjunction with a gas-heated oven having a burner supplied with gas through a thermostatically controlled valve which acts in response to oven temperature to control the supply of gas to maintain the oven at a desired temperature, the valve being adjustable to obtain different oven temperatures, and the system being adapted to indicate when the oven has been heated to the temperature set by the valve; the provision of a system of this class utilizing for the operation of a signal the pressure drop across the valve occurring when the oven reaches its desired temperature; the provision of a system of this class which includes relatively few and simple parts, and which is economical to install in any range design; and the provision of a system of this class which is reliable in operation. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated, the single figure is a view illustrating a system made according to the invention, with certain parts being shown diagrammatically, others being shown in elevation with parts broken away in section, and others in full section.

Referring to the drawing, there is diagrammatically illustrated an oven 1 heated by a main gas burner 3, with a so-called stand-by pilot burner 5 which is ignited when the main burner is manually ignited, being for automatically re-igniting the main burner if and when it goes out without having been turned off. Flow of gas to the main burner is controlled by a combination valve generally designated 7. This valve, which is of known construction, is a combination shut-off and oven temperature regulating and control valve. In general, it comprises valve body 9 having a taper bore 11 leading to an inlet chamber 13. Chamber 13 is separated from an outlet chamber 15 by a partition 17 having a central threaded opening 19. A gas inlet 21 leads into the taper bore 11. Rotary in the taper bore 11 is a plug 23 having an operating knob 25. The plug has an off position blocking the inlet, and is rotary from its off position to supply gas at full inlet pressure from the inlet 21 to inlet chamber 13.

At 27 is shown an annular valve seat having a tubular stem 29 adjustably threaded in the central opening 19 in partition 17, with the valve seat 27 located in the outlet chamber 15. A shaft 31 extends through a bore 33 in the plug 23. At its inner end the shaft has a fork 35 straddling a pin 37 in the stem 29 for coupling the shaft to the stem. The plug 23 is rotary with the shaft on turning the knob 25. Turning the knob (and the shaft) also effects axial adjustment of the valve seat 27 via the threaded connection between stem 29 and the partition 17 for oven temperature setting purposes, as will be made clear. While not shown herein, since it is not material to an understanding of this invention, the knob 25 is hollow and means is provided therein allowing for rotary adjustment of the shaft relative to the plug for purposes of temperature calibration by changing the axial position of the seat 27. The plug is constructed so that full inlet pressure is delivered to inlet chamber 13 at all temperature-control settings of the valve seat.

A cup-shaped bimetallic diaphragm 39 is located in the chamber 15 and has an inside wall 41 and an outside wall 43. A capillary tube 45 leads from a bulb 47 located in the oven to an opening in the bottom of the outside wall 43 of the diaphragm. The bulb and tube are filled with a thermally responsive liquid which is adapted upon thermal expansion to enter between the diaphragm walls and bulge the bottom of the inside wall 41 of the diaphragm toward the valve seat 27 to an extent determined by oven temperature. The bimetallic character of the diaphragm compensates for changes in ambient temperatures in the chamber 15 in known manner. A throttling valve disk 49 is movable toward and away from the valve seat 27. This disk is carried by a center stud 51 received in a socket 53 in the end of a stem 55 toward the valve seat. A guide plate 57 is riveted on this end of stem 55. The other end of the stem 55 is slidable in a collar 59 which is carried by the inside of the bottom of the inside diaphragm wall 41. Collar 59 backs a cup-shaped rosette type leaf spring 61 slidable on the stem 55 and acting against the guide plate 57. The disk 49 is biased in opening direction away from the valve seat 27 by a coil compression spring 63 reacting from a shoulder 65 in the stem 29 of the valve seat.

The valve body has a main gas outlet 67 leading from the chamber 15. A line 69 connects this outlet to the burner 3. The valve body also has a passage 71 leading from inlet chamber 13 to an outlet at 73, with a line 75 connecting this outlet to the pilot burner 5.

Assuming that knob 25 is in its off position corresponding to the off position of plug 23, and that the oven is cold, the bottom of the inside wall 41 of the diaphragm 39 is not bulged (or bulged only a minimum). The valve disk 49 is accordingly forced into a retracted position by spring 63 to a maximum distance to the right of partition 17. The knob 25 is rotary in one direction from its off position to rotate plug 23 to open position and to set the oven temperature which it is desired to reach and maintain. Rotation of the knob in this direction moves valve seat 27 in the direction away from the closing valve disk 49 (toward the left as viewed in the drawing). Thus, as the oven temperature setting is increased, the initial spacing of the valve disk and the valve seat is increased, requiring increased travel of the disk 49 before it can engage the valve seat and shut off flow of gas to the main burner, and thus requiring increased oven temperature in order to bulge the bottom of the inside wall 41 of the diaphragm sufficiently to move the valve disk into position at or near the seat.

Assuming that the knob 25 has been turned on and rotated to a desired temperature setting (noting that the knob conventionally will bear graduations, not shown, to indicate temperature settings read in conjunction with an index mark on the valve body), the valve seat 27 will be located in a position spaced from the fully retracted valve disk 49 a distance corresponding to the desired temperature setting. Gas flows from inlet 21 to inlet chamber 13, thence through stem 29 and outward from between valve seat 27 and disk 49 to chamber 15, thence through outlet 67 and line 69 to burner 3. As the oven heats up to the desired temperature, and the liquid in bulb 47 and tube 45 expands, the bottom of the inside wall 41 of the diaphragm is progressively bulged more and more toward the valve seat. This moves the valve disk 49 nearer and nearer the seat, thereby increasingly throttling the flow of gas to the main burner 3. When the oven reaches the desired temperature, the valve disk attains a partially open steady throttling position wherein the flow of gas is only sufficient to make up heat loss from the oven, thereby maintaining the oven at the desired temperature.

Under some circumstances, as during low temperature control, the valve disk may fluctuate between a closed or nearly closed position with respect to the valve seat, completely or nearly completely shutting off flow of gas to the main burner, and a somewhat more open position than its steady throttling position. The pilot burner 5 re-ignites the main burner in case the valve disk shuts off the flow to the main burner.

The purpose of the cup-shaped spring 61 is to allow for overtravel of the bottom of the inside wall 41 of the diaphragm 39 if the valve disk engages the valve seat. Assuming that the bulging has been such that the disk has been pushed into engagement with the seat, and that conditions are such that the liquid in bulb 47 and line 45 is further expanded, thereby causing further bulging, the collar 59 simply slides on stem 55 and the excess bulging is taken up by compression of spring 61.

It will be observed from the above that when the oven, in heating up, reaches its desired temperature, and the valve disk attains its substantially steady throttling position, the pressure drop or differential across the valve from chamber 13 to chamber 15 (which increases as the valve disk moves nearer the valve seat) reaches a value corresponding to the throttling effect of the valve disk in its steady position. I utilize this effect in a system for indicating when the oven reaches its desired temperature. For this purpose, I provide a differential pressure switch generally indicated at 77 controlling a signal lamp 79. The switch comprises a case consisting of two joined cups 81 and 83 with a diaphragm 85 clamped between the rims 87 and 89 of the cups. The cups are held together by a ring 91 swaged on their rims. Cup 81 has a central inlet 93 connected to the main outlet 67 of valve 7, as by means of a line 95 connected to line 69. Cup 83 has a central inlet 97 connected to receive line pressure when valve 7 is turned on, as by means of a line 99 connected to an outlet 101 from chamber 13 in valve body 9. A plate 103 of insulating material is fixed to the inside of the base of cup 81 by bolts 105 and 107, having nuts 109 threaded thereon. These bolts are insulated from cup 81 and serve as terminal posts. Bolt 105 holds in place a spring switch blade 111 engageable by a center stud 113 carried by diaphragm 85. The blade has a contact 115 at its free end engageable with the head of bolt 107. The blade has a spring arm 117 which reaches back over the blade from its free end, the arm being inclined toward plate 103. Arm 117 is engageable by an adjusting screw 119, threaded centrally in plate 103 and accessible through the inlet 93 to adjust the degree of differential pressure required on opposite sides of the diaphragm to move the blade to circuit-closing position. The plate 103 has openings 121 for admitting gas to the cup 81. The switch is connected via terminal posts 105 and 107 in series in a lamp circuit 123, including lamp 79, across a line 125.

The construction of the switch 77 and its mode of connection in the indicator system is such that whenever the valve 7 is turned on, the diaphragm 85 is subjected on one side (its upper side as viewed in the drawing) to gas pressure corresponding to line pressure. This tends to close the switch, but is resisted by the gas pressure on the other side of the diaphragm and the stress in the spring switch blade 111 and arm 117. This resisting gas pressure corresponds to the pressure in the main outlet of valve 7 and decreases as the pressure differential across valve 7 increases. The switch 77 is so adjusted by means of screw 119 that the pressure differential on opposite sides of the diaphragm required to close the blade 111 (the operating differential of the switch) corresponds to the pressure differential across valve 7 reached when the oven reaches its desired temperature and valve disk 49 attains its steady, temperature-maintaining throttling position. Thus, the lamp 79 is turned on when the oven reaches its desired temperature and remains on as long as the oven is maintained substantially at this desired temperature, noting that the pressure differential across valve 7 remains substantially constant with the valve disk 49 in its steady position.

It may be observed that the steady-condition pressure differential across valve 7 is not exactly constant for all oven temperature settings, being lower for higher temperature settings. This is because it is necessary to have a slightly higher rate of flow of gas to the burner 3 (less throttling by valve disk 49) to maintain a steady condition at higher temperatures due to higher heat loss from the oven. However, this variation in the steady-condition pressure differential is minor, and is taken care of by adjusting the switch 77 to close in response to the steady-condition pressure differential across valve 7 occurring in the highest temperature setting. Under these circumstances, for a low temperature setting the switch 77 may close slightly before the oven reaches the set temperature, but the variation is negligible.

It will be understood that various other adjustable thermostatic control valves may be substituted for the one shown at 7, and that other types of differential pressure switches may be substituted for 77. Also, various lines such as 69 may have introduced into them various forms of auxiliary valves, such as known safety valves, automatic clock valves, etc., without changing the scope of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. An indicator system for a gas-heated appliance of the type having a gas burner supplied with gas under control of a temperature-regulating thermostatic valve acting in response to the temperature of the appliance increasingly to throttle the flow of gas to the burner as the appliance temperature rises, and attaining a substantially steady throttling condition when the appliance is heated to a temperature determined by the valve, comprising an electric signal and a differential pressure switch controlling the signal, said differential pressure switch being connected across the valve, the operating differential of the differential pressure switch corresponding substantially to the pressure differential across the valve when in its said steady throttling condition, whereby the signal is operated when the appliance is heated substantially to the temperature set by the valve.

2. An indicator system for a gas-heated oven of the type having a gas burner supplied with gas under control of a temperature-regulating thermostatic valve acting in response to the temperature of the oven increasingly to throttle the flow of gas to the burner as the oven heats up, and attaining a substantially steady throttling condition when the oven is heated to a temperature determined by he valve, comprising a lamp and a differential pressure switch controlling the lamp, said differential pressure switch being connected across the valve, the operating differential of the switch corresponding to the pressure differential across the valve when in its said steady throttling condition, whereby the lamp is operated when the oven is heated substantially to the temperature set by the valve.

3. An indicaor system for a gas-heated appliance of the type having a gas burner supplied with gas under control of a combination shut-off and temperature-regulating valve having a thermostatic control acting in response to the temperature of the appliance increasingly to throttle the flow of gas to the burner as the appliance heats up, and attaining a substantially steady throttling condition when the appliance is heated to a temperature determined by the valve, the valve being adjustable to different temperature settings, comprising an electric signal and a differential pressure switch controlling the signal, said differential pressure switch being connected across the valve and responsive to the pressure differential across the valve when the valve is on, the operating differential of the differential pressure switch corresponding to the pressure differential across the valve when in its said steady throttling condition, whereby the signal is operated when the appliance is heated substantially to the temperature set in accordance with the adjustment of the valve.

4. An indicator system for a gas-heated oven of the type having a gas burner supplied with gas under control of a combination shut-off and temperature-regulating valve having a thermostatic control acting in response to the temperature of the oven increasingly to throttle the flow of gas to the burner as the oven heats up, and attaining a substantially steady throttling condition when the oven is heated to a temperature determined by he valve, the valve being adjustable to different temperature settings, comprising a lamp and a differential pressure switch controlling the lamp, said differential pressure switch being connected across the valve and responsive to the pressure differential across the valve when the valve is on, the operating differential of the switch corresponding to the pressure differential across the valve when in its said steady throttling condition, whereby the signal is operated when the oven is heated substantially to the temperature set in accordance with the adjustment of the valve.

References Cited in the file of this patent
UNITED STATES PATENTS

| | | |
|---|---|---|
| 2,361,530 | Burch | Oct. 31, 1944 |
| 2,488,388 | Evans | Nov. 15, 1949 |